United States Patent
Rose, Sr.

(10) Patent No.: US 6,242,828 B1
(45) Date of Patent: Jun. 5, 2001

(54) FLYWHEEL-ROTOR APPARATUS

(75) Inventor: Robert Ervin Rose, Sr., Fort Atkinson, WI (US)

(73) Assignee: Briggs & Stratton Corporation, Milwaukee, WI (US)

( * ) Notice: Subject to any disclaimer, the term of this patent is extended or adjusted under 35 U.S.C. 154(b) by 0 days.

(21) Appl. No.: 09/442,560

(22) Filed: Nov. 18, 1999

(51) Int. Cl.$^7$ ................................ H02K 7/02
(52) U.S. Cl. .............. 310/74; 310/70 R; 310/70 A; 310/153; 310/104; 123/149 C
(58) Field of Search .................. 310/74, 70 R, 310/70 A, 153, 155, 156, 105, 104; 123/149 C, 149 D, 149 R

(56) References Cited

U.S. PATENT DOCUMENTS

| | | | |
|---|---|---|---|
| 2,568,479 | * 9/1951 | Armstrong et al. | 171/209 |
| 2,945,138 | * 7/1960 | Strang | 310/153 |
| 3,390,291 | 6/1968 | Eberline et al. | 310/156 |
| 3,663,850 | 5/1972 | Phelon | 310/153 |
| 3,828,212 | 8/1974 | Harkness et al. | 310/153 |
| 3,955,550 | 5/1976 | Carlsson | 123/149 |
| 3,989,023 | * 11/1976 | Florio et al. | 123/146.5 A |
| 4,003,359 | * 1/1977 | Hays | 123/146.5 A |
| 4,345,553 | * 8/1982 | Magrane et al. | 123/149 C |
| 4,358,727 | 11/1982 | Campen | 322/90 |
| 4,423,345 | * 12/1983 | Nilsson | 310/153 |
| 4,433,473 | * 2/1984 | Benedetti | 29/598 |
| 4,550,697 | 11/1985 | Campen | 123/149 |
| 4,617,507 | 10/1986 | Eisenhaure et al. | 322/4 |
| 4,631,456 | 12/1986 | Drescher et al. | 318/140 |
| 4,720,638 | 1/1988 | Vollbrecht | 290/38 |
| 4,873,962 | 10/1989 | Sanfranek | 123/599 |
| 5,485,666 | 1/1996 | Welborn et al. | 29/436 |

FOREIGN PATENT DOCUMENTS 0 903 832 A1   3/1999   (EP)   ................ H02J/7/16

* cited by examiner

*Primary Examiner*—Nestor Ramirez
*Assistant Examiner*—Thanh Lam
(74) *Attorney, Agent, or Firm*—Michael Best & Friedrich LLP

(57) ABSTRACT

A flywheel-rotor apparatus that transforms electrical power into mechanical power and mechanical power into electrical power through a unitary device is disclosed. The invention includes an inner portion and an outer portion which are made of an electrically conductive material, such as aluminum or an aluminum alloy, for example. An air channel or gap separates at least part of the inner from the outer portions and a stator is positioned radially inward from the inner portion. At least one electric current path in the inner portion enables electric charge flow when the stator magnetically interacts with the inner portion. A magnet for a magneto ignition system may also be included in the apparatus to produce current for distribution to the spark plugs.

30 Claims, 6 Drawing Sheets

FLYWHEEL-ROTOR APPARATUS

BACKGROUND OF THE INVENTION

1. Technical Field of the Invention

The present invention relates to a flywheel-rotor, and more particularly, to a flywheel-rotor apparatus that converts electrical to mechanical power to start an engine and that generates electric power by varying the speed of a moving magnetic field.

2. Description of the Related Art

Flywheels are designed to stabilize the turning forces generated by combustion engines. These devices, which are generally attached to shafts, are of sufficient mass to oppose the varying torque of an engine. The inertia of the flywheel reduces cyclic variations in engine speed.

SUMMARY OF THE INVENTION

The invention comprises an unitary flywheel-rotor having an inner portion and an outer portion made of an electrically conductive material, such as aluminum or an aluminum alloy, for example. An air channel or gap separates at least part of the inner from the outer portions, and a stator is positioned radially inward from the inner portion. At least one electric current path is established in the inner portion to enable electric current flow when the stator magnetically interacts with the inner portion.

In one aspect of the invention, the inner portion further includes an electrically conductive annular portion electrically connected to the current path. A disk unitarily joined to the inner portion may also be used in an aspect of the invention. Preferably, the disk has radially extending fins that may be modulated to reduce air flow drag and limit noise.

In another aspect of the invention, the flywheel-rotor apparatus includes a plurality of stacked laminations at least partially enclosed by sections of the inner and the outer portions. Preferably, the laminations are substantially circular in shape, although other shapes known to those of ordinary skill in the art are within the scope of the invention.

The above-described laminations have inner and outer surfaces. A plurality of teeth may be arranged around at least part of the inner or the outer surfaces or may be arranged around a portion of both surfaces. Alternatively, some of the laminations may have teeth arranged around only their inner surfaces while other laminations may have teeth arranged around only their outer surfaces.

In yet another aspect of the invention, one or more of the laminations may have an axis of symmetry coincident with the diameter of the inner or the outer portions. In these exemplary embodiments, teeth arranged around a portion of the inner, the outer, or both of the surfaces are distributed such that the teeth are symmetrically arranged around one or more of a portion of these surfaces. In alternative embodiments, the laminations may not be symmetrical, and thus the teeth may be arranged asymmetrically around one or more of a portion of the surfaces. In yet another embodiment, some of the laminations have teeth on their outer surfaces, whereas other laminations do not have outer teeth.

In yet another aspect of the invention, a magnet may be positioned adjacent to the outer surface of some of the laminations. These laminations may include a spaced apart portion which forms a cavity to receive the magnet. Like the inner teeth that may be substantially flush with the inner surface, the magnet may be substantially flush with or spaced apart from the outer surface.

The disclosed inner and outer portions form a unitary flywheel-rotor apparatus that moderates speed fluctuations and stores excess mechanical energy for later use. The flywheel-rotor apparatus can transform mechanical power into electrical power, can transform electrical power into mechanical power, and may further function as a voltage generator and a voltage regulator that matches electrical output to the electrical load and/or to the charging requirements of a battery without regard to engine speed. These features as well as other advantages of the invention will become apparent upon consideration of the following detailed description and accompanying drawings of the embodiments of the invention described below.

DETAILED DESCRIPTION

Figure 1:
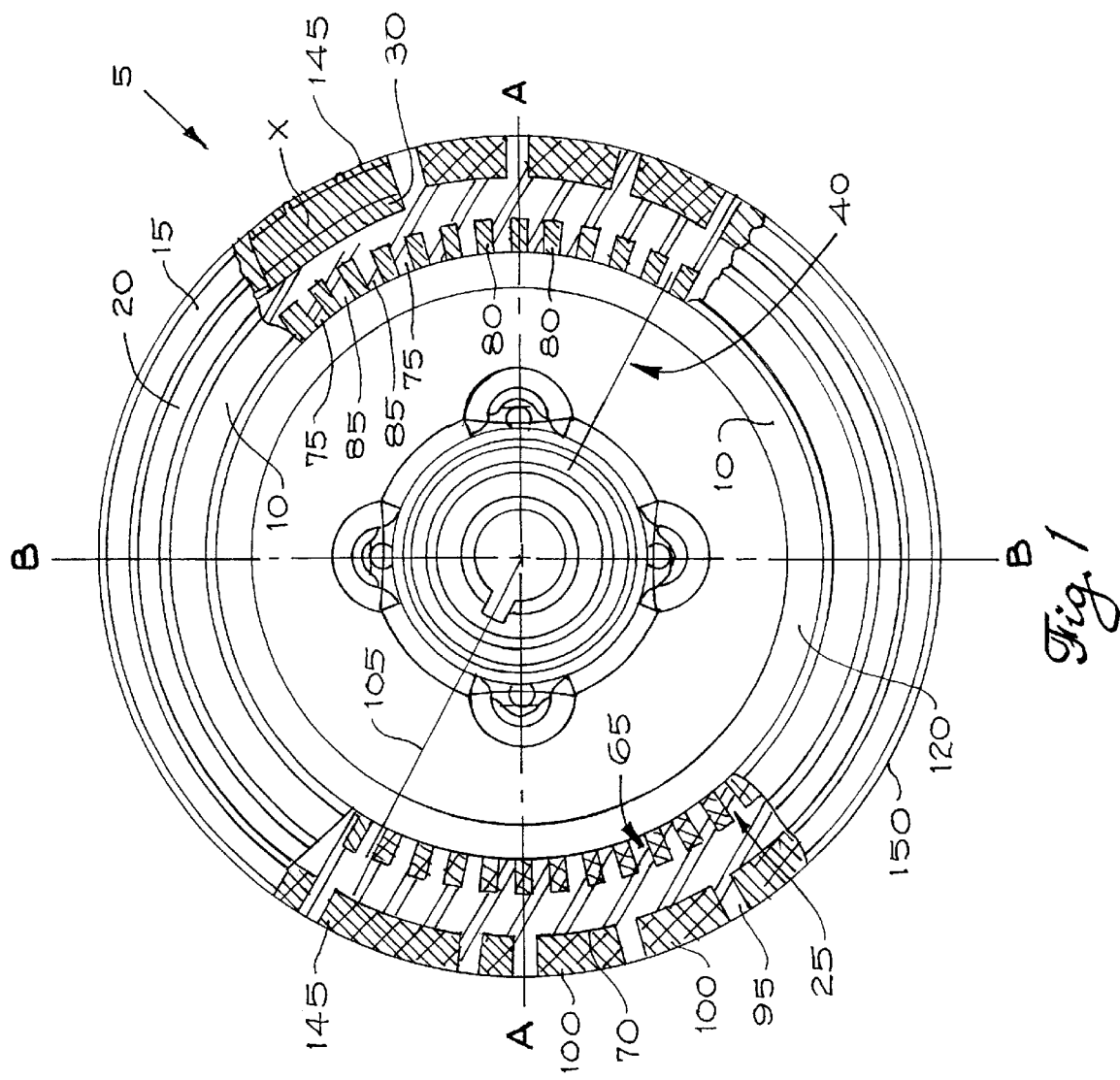
FIG. 1 is top partial sectional view of an embodiment of the invention.

In the drawings depicted elements are not necessarily drawn to scale, and alike and similar elements are designated by the same reference numeral through several views.

Figure 2:
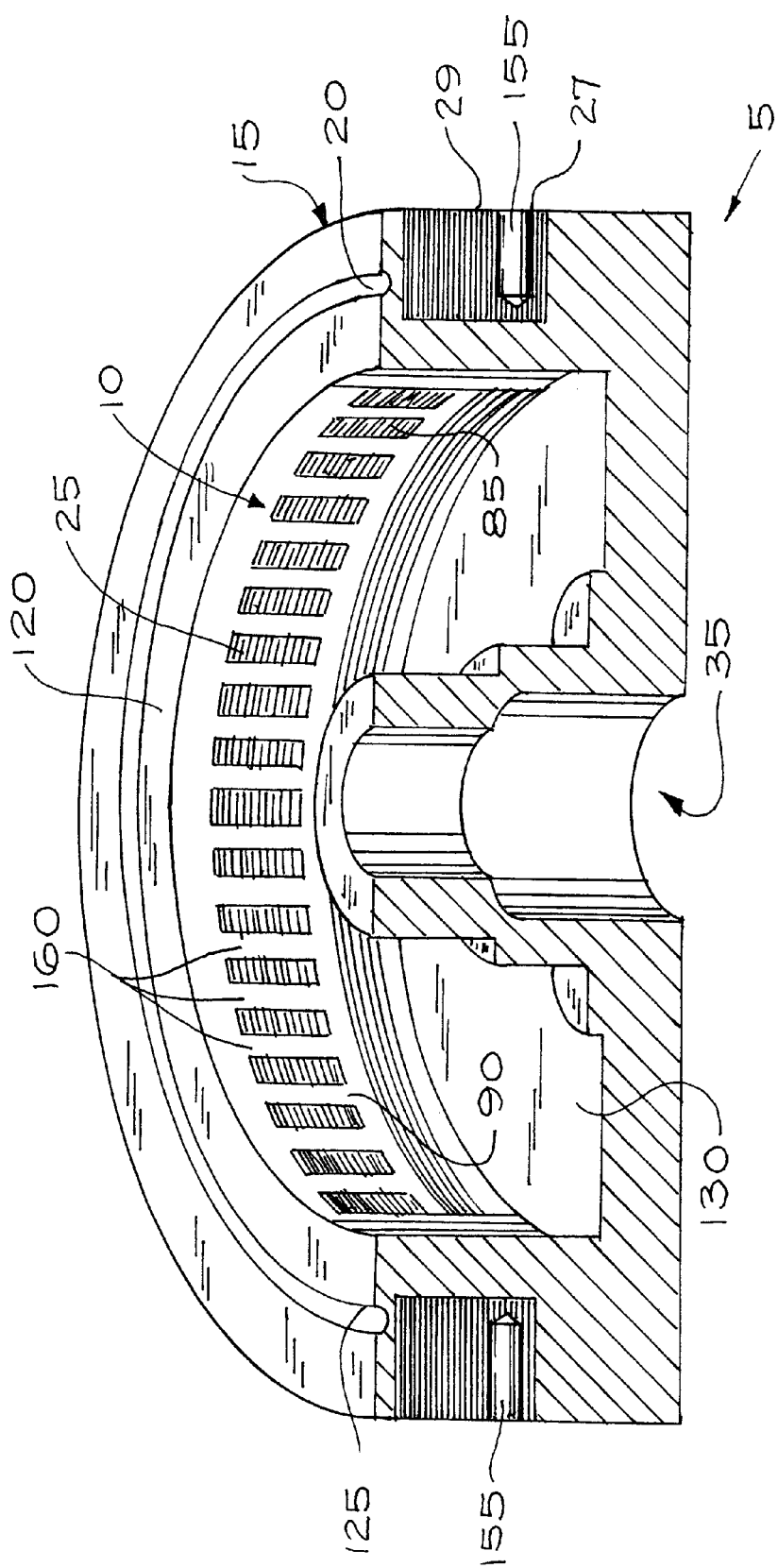
FIG. 2 is a side cross-sectional view along line A—A of FIG. 1.

Referring to FIGS. 1 and 2, a flywheel-rotor apparatus 5 is illustrated which includes an inner portion 10 and an outer portion 15 separated by an air channel or gap 20. The inner and outer portions 10 and 15 form a unitary flywheel-rotor apparatus 5 which preferably encloses a plurality of laminations 25 and a magnet 30.

Figure 4:
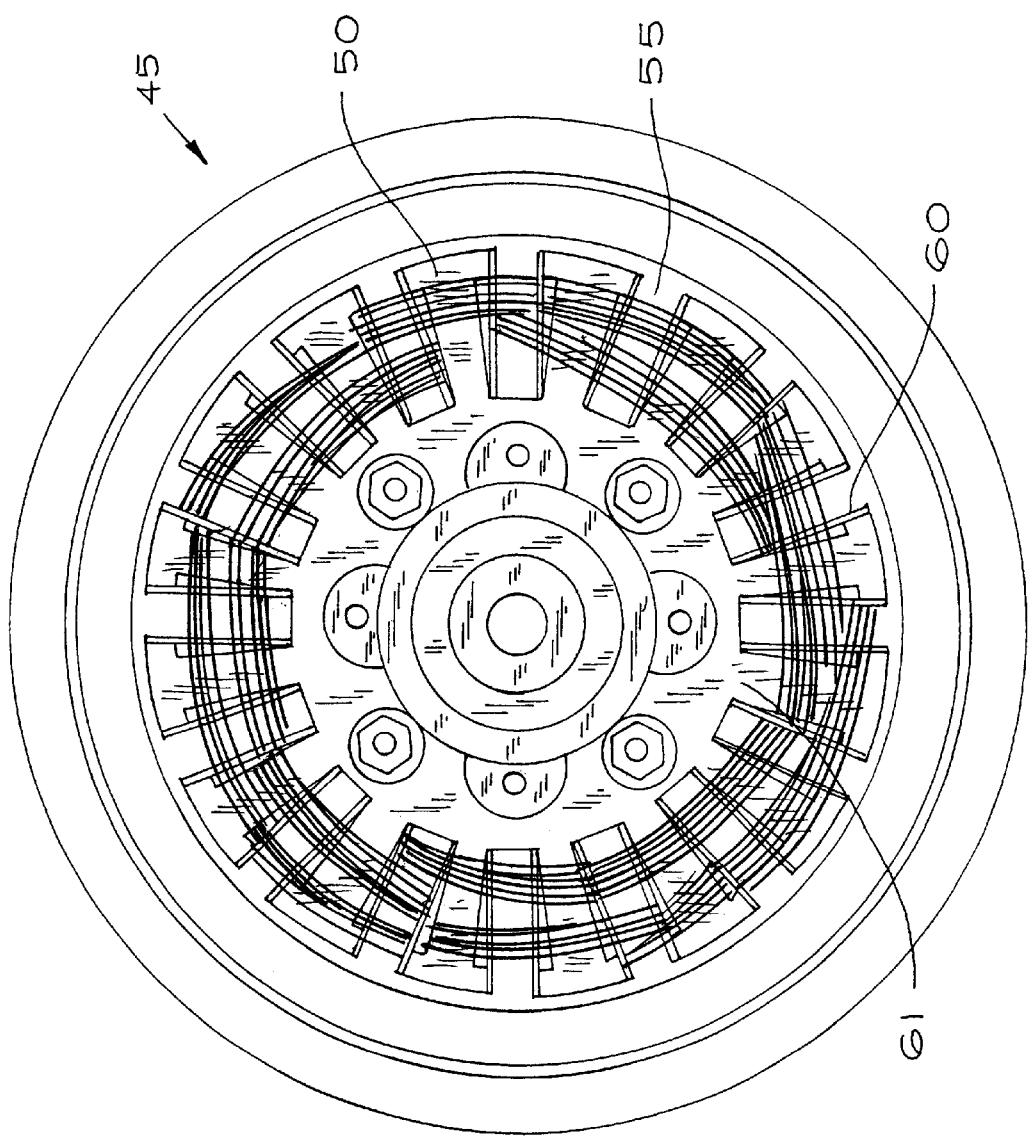
FIG. 4 is a top view of a stator used with the flywheel-rotor apparatus of FIG. 1.
Figure 5:
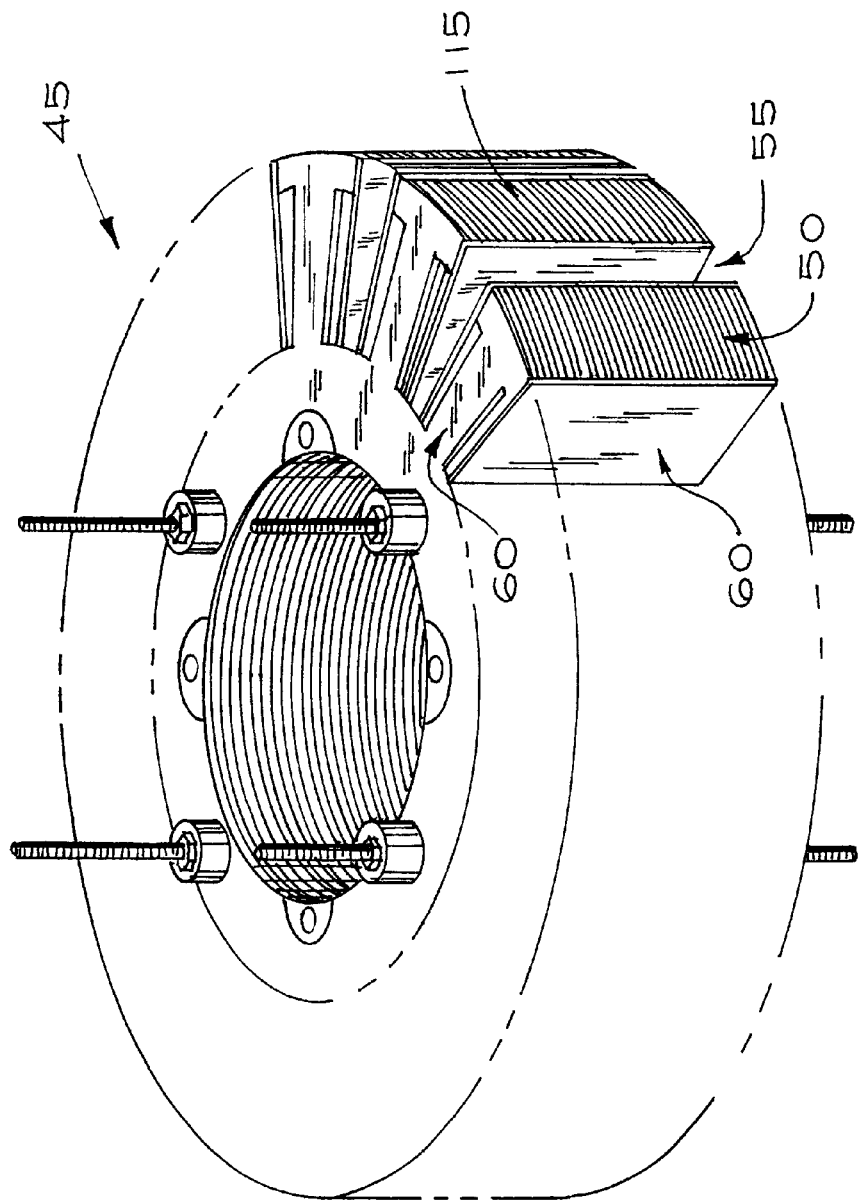
FIG. 5 is a perspective view of the stator of FIG. 5 without windings.

The inner portion 10 and a hub 35 define a cylindrical space 40 dimensioned to receive a stator 45 such as of the type shown in FIGS. 4 and 5. The stator 45 is of generally cylindrical shape formed of stacked laminations 115. Each lamination includes a plurality of radially extending portions 50 which when stacked and mechanically interconnected together define a plurality of cavities 55 that can receive windings or magnets. Slot insulators 60, made of a nonconducting material such as cardboard and paper, align the inner surfaces of the cavities 55. End insulators 61 cover the upper and lower surfaces of the stator 45. While it is not intended that the stator 45 be limited to any particular configuration, the preferred embodiment of the invention employed an eight pole wire wound stator 45.

As partially shown in FIG. 2, the inner and outer portions 10 and 15 enclose a plurality of stacked laminations 25. The laminations 25 are stacked and preferably fastened together by one or more mechanical couplings like rivets or other known fastening methods. Once fastened together, the laminations 25 are placed within a die that is used for forming the flywheel-rotor apparatus 5.

Each lamination includes an inner and an outer surface 65 and 70, respectively. Inner surface 65 partially encloses the cylindrical space 40 that receives the stator 45 as shown in FIG. 1. At its inner surface 65, each lamination has a plurality of inner teeth 75 that extend radially inward toward the hub 35. The teeth 75 are separated by a plurality of inner cavities 80 that are dimensioned to receive casting material. Preferably, the inner teeth 75 have an exterior surface 85 dimensioned such that when a stack of laminations 25 are aligned and positioned in a die, the exterior surfaces 85 of the inner teeth 75 are substantially flush with the arc of the inner surface 90 as shown in FIG. 2. In these embodiments, the inner teeth 75 preferably form part of the inner surface 90.

At its outer surface 70, each lamination has a plurality of outer teeth 95 that extend radially outward. The outer teeth 95 are separated by a plurality of outer cavities 100 that are dimensioned to receive casting material or a magnet as shown in FIG. 1. While the exemplary embodiment of FIG. 1 illustrates a large number of teeth arranged around the inner and the outer surfaces 65 and 70, the scope of the invention encompasses embodiments in which the outer surface 70 has the same number or more teeth than the inner surface 65.

Each lamination also has an inner (not shown) and an outer diameter segment 105 that in part coincide with the diameters of the inner and outer surfaces 65 and 70, respectively. These segments serve in some exemplary embodiments as axes of symmetry such that the inner and/or outer teeth 75 and 95 are symmetrically arranged around a portion of the inner and/or outer surfaces 65 and 70, respectively. For example, as shown in FIG. 1, the inner diameter segment 105 is a line of symmetry for the inner teeth 75 in that the inner teeth are symmetrically disposed on opposite sides of diameter segment 105. Conversely, the outer teeth 95 lack a balanced symmetry and thus are asymmetrically arranged around the outer surface 70.

As shown in FIG. 2, the air channel or gap 20 separates the inner from the outer portion 10 and 15, and also in part defines an electrically conductive annular portion 120. The gap 20 extends from a lateral 125 edge of the annular portion 120 to the uppermost lamination that is partially enclosed by the inner and outer portions 10 and 15. In this arrangement, the air disposed in the gap 20 serves as a dielectric that electrically insulates the annular portion 120 from the outer portion 15. Without gap 20, current could travel from annular portion 120 to outer portion 15, thereby reducing the output power of the motor.

Figure 3:
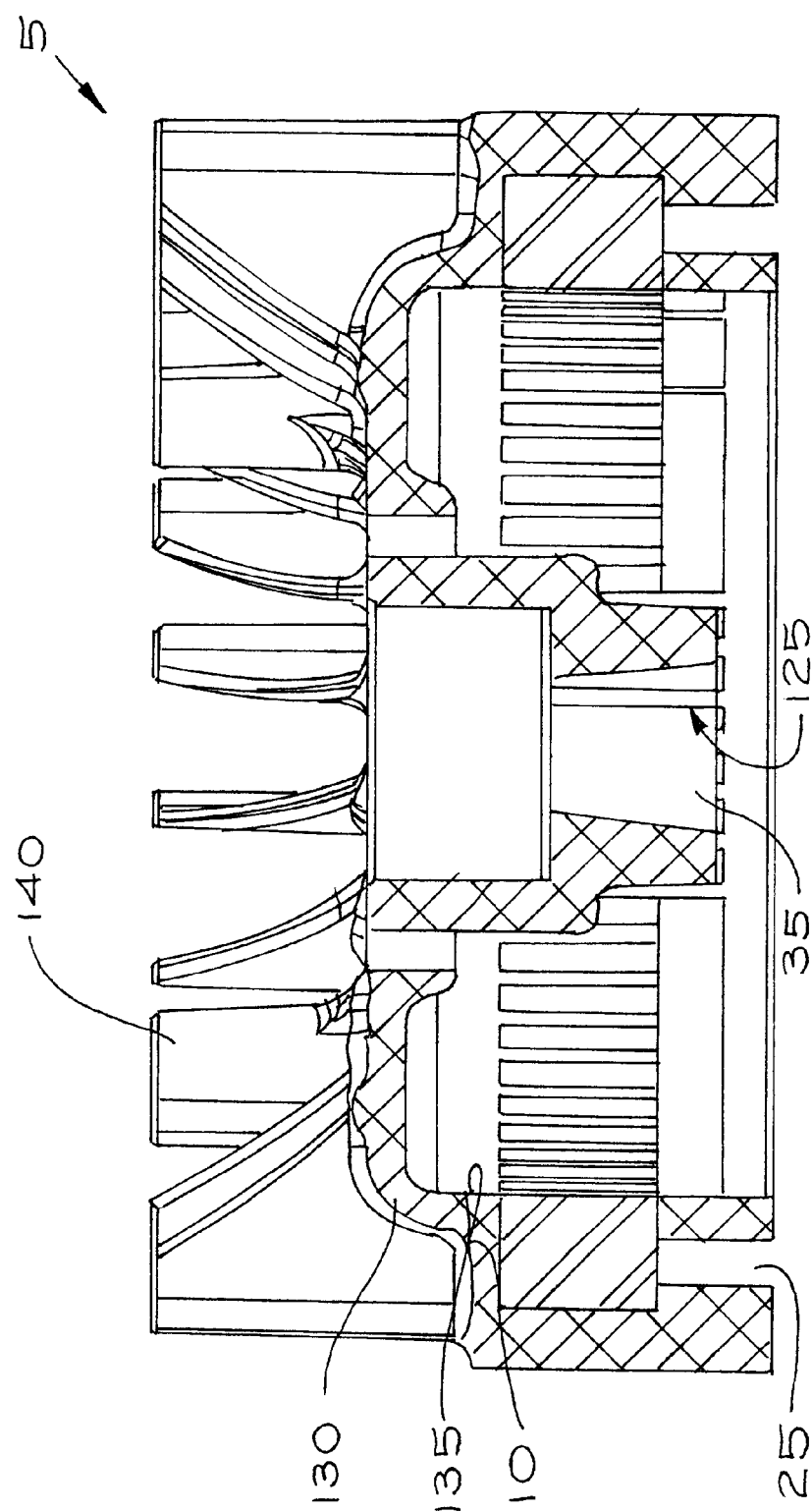
FIG. 3 is a side cross sectional view along line B—B of FIG. 1 with cooling fins included.

The flywheel-rotor apparatus 5 illustrated in FIG. 3 is cast with a cylindrical hub 35, a keyway 125, and a disk 130. The disk 130, which has an outer surface 135 cast to the inner portion 10, has radially extending fins 140 which comprise a unitarily-formed cooling fan. Preferably, the fins 140 are modulated to reduce air flow drag and limit noise.

To produce current for spark ignition, a magnet 30, such as a permanent magnet, may be located within the outer portion 15 of the flywheel-rotor apparatus 5 as shown in FIG. 1. The magnet 30 and steel centerpole X are part of a magneto ignition system. Centerpole X is preferably positioned radially adjacent to the outer surface 70 of a portion of the laminations 25. These portions of laminations 25 preferably include a spaced apart portion between two teeth which defines a cavity 145 dimensioned to receive magnet 30 and centerpole X. In this arrangement, the magnet 30 and its centerpole X may be substantially flush with or form part of the outer surface 150. As an alternative, the centerpole X may be spaced from the outer surface 150.

The flywheel-rotor apparatus 5 is cast by positioning the laminations 25 and the magnet 30 within a die. Preferably, the laminations 25 are made of steel or a steel alloy coated with a thin oxide, the magnet 30 is made of ferrite material, and centerpole X is made of sintered steel. The oxide minimizes circulatory currents or eddy currents induced in the laminations 25 when the flywheel-rotor apparatus 5 is exposed to a moving magnetic field.

A molten aluminum alloy, such as a Briggs and Stratton K51 aluminum alloy that includes aluminum and silicon, is added to the die which may have any desired shape. The flywheel-rotor apparatus 5 is then machined to form the gap 20 and to remove any residual casting materials.

If desired, the machining process can expose the stacked inner teeth 75 so that they are substantially flush with the inner surface 90, and the outer surface is machined so that centerpole X is substantially flush with the outer surface 150.

After the flywheel-rotor apparatus 5 is machined, balancing holes 155 can be drilled in non-critical locations partially through the outer portion 15 as shown in FIG. 2, if necessary to achieve static and dynamic balancing.

From the foregoing detailed description and the accompanying figures it should be apparent that the stacked inner teeth 75 of the laminations 25 separate a plurality of inner wall portions 160 made of a conductive material. The conductive material extends between the conductive annular portion 120 and the disk 130 as shown in FIG. 2. The higher resistivity of laminations 25 compared to the resistivity of wall portions 160 electrically separate the inner wall portions 160 to form a plurality of current paths electrically connected to the conductive annular portion 120. In this arrangement, the laminations 25 serve as electrical isolators and the inner wall portions 160 serve as electrical conductors. The inner wall portions 160 illustrated in FIG. 2 and variations thereof, are the structure that performs the function of conducting current through the inner surface 90 of the flywheel-rotor apparatus 5. Similarly, the stacked inner teeth 75 of the laminations 25 and variations thereof are the structure that perform the function of electrically separating the inner wall portions 160 or current paths of the flywheel-rotor apparatus 5, as well as providing a path for the magnetic fields generated by the electrical current flowing in these paths.

The flywheel-rotor apparatus 5 is able to produce high levels of electrical power and may further function as a voltage regulator that matches the electrical output to the electrical load and/or to the charging requirements of a battery without regard to engine speed. If desired, the stator 45 may be controlled by a central processor or by other devices or methods. In these applications, the electrical switching of the stator 45 induces an electric current that flows through the inner wall portions 160 and the annular portion 120. Because at any given point the magnitude and direction of the magnetic field can be changed by electronic switching devices and/or methods, the polarity, direction, current paths, and magnitude of the current can also be changed. Under this control the flywheel-rotor apparatus 5 may function as a variable voltage generator and/or a voltage regulator. It has been found that in one exemplary embodiment, the flywheel-rotor apparatus 5 can produce a substantially trapezoidal output waveform.

Figure 6:
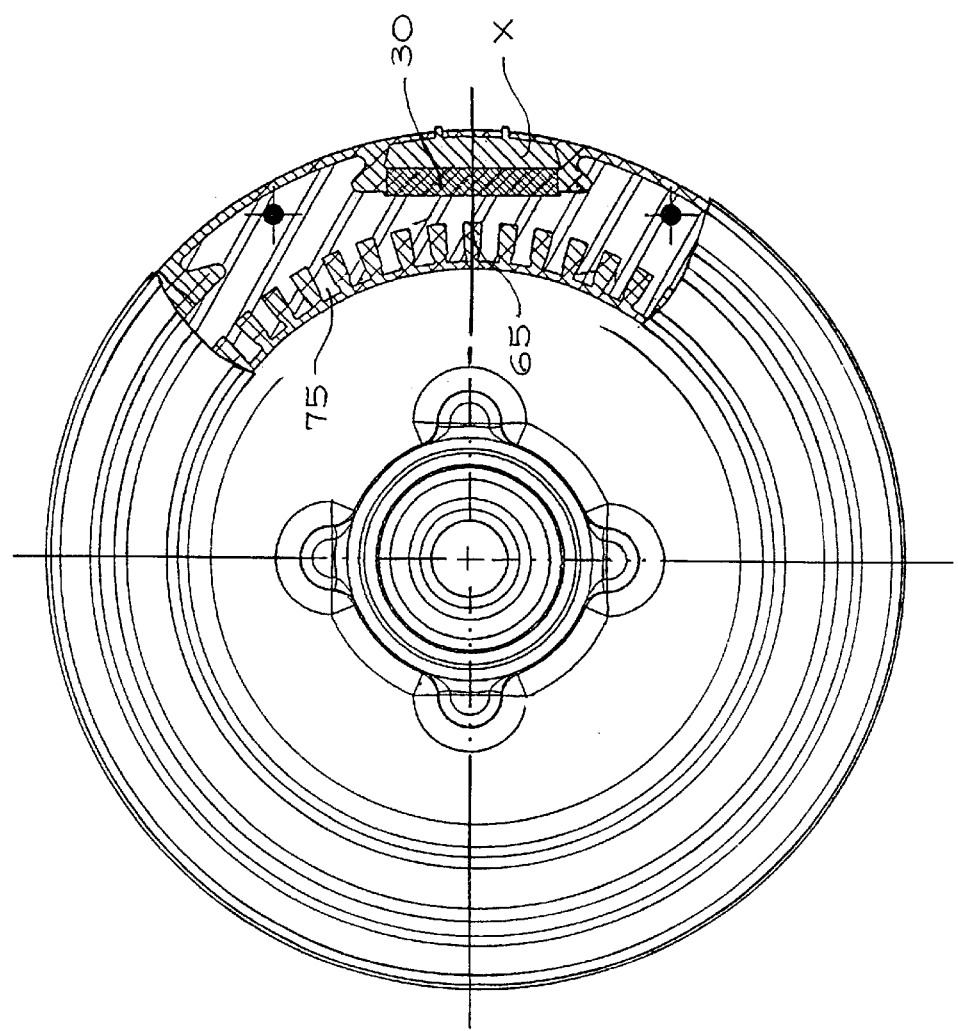
FIG. 6 is a top view of another variation of the invention shown in partial section.

It should be noted that the invention is not limited to the illustrated configurations of the laminations 25 nor must the invention include a magnet 30 or the engine include a magneto ignition system. As illustrated in FIG. 6, the laminations may include only inner teeth 75 arranged along only a portion of the inner surface 65. The teeth 75 may have a balanced symmetry as shown or may be asymmetrically arranged along the inner surface 65. Likewise, in some flywheel-rotor assemblies 5 some of the laminations 25 may have only inner teeth 75 while the remaining laminations 25 have only outer teeth 95 arranged around their outer surface 70. As an alternative, all of the laminations 25 may have teeth arranged along their inner surface 65, with only a portion 27 (FIG. 2) of the laminations 25 having outer teeth 95 arranged along their outer surface 70. The other portion 29 of the laminations would not have outer teeth. For example, a selected number of the lower laminations may not have outer teeth when a magnet is disposed adjacent the lower portion of outer surface 70, to prevent interference with the magnet. Of course, each lamination may or may not have a balanced symmetry, just as the embodiments may or may not include a magnet 30.

Outer teeth may also be distributed assymmetrically on the outer surface of the flywheel-rotor apparatus. The purpose of the outer teeth is to enable the speed of the flywheel-and thus the engine-to be determined several times per crankshaft revolution, by causing an associated sensor to generate a signal each time an outer tooth passes the sensor. When the outer teeth are distributed assymmetrically, it is also possible to determine the position of the flywheel and the crankshaft, thereby enabling the flywheel to be indexed with respect to a home position. One advantage of this arrangement is that the flywheel-rotor assemblies 5 can be designed to function as an encoder and an indexing device in addition to a flywheel, voltage generator, and a voltage regulator.

Many other alternative embodiments are also possible. For example, the stator 45 discussed above may be positioned radially outward from the outer surface 150. In this case, the configurations of teeth arranged along the outer and the inner surfaces 65 and 70 could be reversed, such that the outer perimeter of the flywheel-rotor apparatus 5 would include conductive outer wall portions separated by portions of the stacked laminations 25 and a conductive annular portion. Of course, a magnet 30 or magneto could also be positioned within the inner portion 10 flush or spaced apart from the inner surface 90. Furthermore, all of the other disclosed variations described above including the asymmetrical and the symmetrical distribution of teeth, for example, may also be used with this embodiment.

It should also be understood that as the inner diameter of the flywheel-rotor assemblies 5 increases the torque of the flywheel-rotor assemblies 5 increase at a squared rate. It has also been found that the torque of the flywheel-rotor assemblies 5 linearly increase with the height of the stacked laminations 25.

The foregoing detailed description describes only a few of the many forms that the present invention can take, and should therefore be taken as illustrative rather than limiting. It is only the following claims, including all equivalents that are intended to define the scope of the invention.

What is claimed is:

1. A flywheel-motor apparatus, comprising:
    a flywheel-rotor assembly comprising
        an outer portion comprising an electrically conductive material,
        an inner portion comprising an electrically conductive material positioned radially inward from said outer portion,
        a gap separating at least a part of said outer and said inner portions,
        a plurality of stacked laminations at least partially enclosed by said outer and said inner portions, and
        a stator positioned radially inward from said inner portion.

2. The flywheel-motor apparatus of claim 1, wherein said inner portion further comprises at least one current path and an electrically conductive annular portion electrically connected with said at least one current path.

3. The flywheel-motor apparatus of claim 1, wherein said flywheel-rotor assembly further comprises at least one balancing hole passing through at least a part of said outer portion.

4. The flywheel-motor apparatus of claim 1, wherein said flywheel-rotor assembly further comprises a disk having an outer surface, said disk unitarily joined to said inner portion and having radially extending modulated fins formed on said outer surface.

5. The flywheel-motor apparatus of claim 1, wherein said outer and said inner portions are cast from an aluminum alloy.

6. The flywheel-motor apparatus of claim 1, wherein said inner and outer portions have respective sections that extend above said stacked laminations, and wherein said gap is disposed between the sections of the inner and outer portions which extend above said stacked laminations.

7. The flywheel-motor apparatus of claim 1, wherein said gap includes a dielectric material.

8. A flywheel-motor apparatus of claim 7, wherein said dielectric material includes air.

9. The flywheel-motor apparatus of claim 1, wherein said at least some of laminations are substantially circular in shape.

10. The flywheel-motor apparatus of claim 1, wherein said laminations have an inner surface, and wherein at least some of said laminations have inner teeth arranged around at least a part of said inner surface.

11. The flywheel-motor apparatus of claim 10, wherein said inner teeth are symmetrically arranged around at least part of said inner surface.

12. The flywheel-motor apparatus of claim 11, wherein at least some of said inner teeth are symmetrically arranged around said inner surface.

13. The flywheel-motor apparatus of claim 1, wherein said laminations have an outer surface, and wherein at least some of said laminations have outer teeth arranged around at least a part of said outer surface.

14. The flywheel-motor apparatus of claim 13, wherein said outer teeth are symmetrically arranged around at least a part of said outer surface.

15. The flywheel-motor apparatus of claim 13, wherein at least some of said outer teeth are asymmetrically arranged around said outer surface.

16. The flywheel-motor apparatus of claim 1, wherein said plurality of stacked laminations has an inner and an outer surface, a plurality of inner teeth, and a plurality of outer teeth arranged around at least a part of said outer surface.

17. The flywheel-motor apparatus of claim 1, wherein said laminations have an outer surface and wherein only some laminations have outer teeth arranged around at least a part of said outer surface.

18. The flywheel-motor apparatus of claim 17, wherein said some laminations comprise at least one third of said stacked laminations.

19. The flywheel-motor apparatus of claim 1, wherein said flywheel-rotor assembly further comprises at least one magnet positioned adjacent to some of said laminations.

20. The flywheel-motor apparatus of claim 19, wherein said at least one magnet is a permanent magnet.

21. The flywheel-motor apparatus of claim 19, wherein said laminations have an inner and an outer surface, and wherein said magnet is positioned between at least two teeth arranged around said outer surface.

22. The flywheel-motor apparatus of claim 19, wherein said magnet forms a unitary part of said outer portion.

23. A flywheel-motor apparatus, comprising:
   a flywheel-rotor assembly comprising
      an outer portion comprising an electrically conductive material,
      an inner portion comprising an electrically conductive material positioned radially inward from said outer portion,
      a gap separating at least a part of said outer and said inner portions,
      at least one balancing hole passing through at least a part of said outer portion, and
      a stator positioned radially inward from said inner portion.

24. The flywheel-motor apparatus of claim 23, wherein said inner portion further comprises at least one current path and an electrically conductive annular portion electrically connected with said at least one current path.

25. The flywheel-motor apparatus of claim 23, wherein said flywheel-rotor assembly further comprises a disk having an outer surface, said disk unitarily joined to said inner portion and having radially extending modulated fins formed on said outer surface.

26. The flywheel-motor apparatus of claim 23, wherein said outer and said inner portions are cast from an aluminum alloy.

27. A flywheel-motor apparatus, comprising:
   a flywheel-rotor assembly comprising
      an outer portion comprising an electrically conductive material,
      an inner portion comprising an electrically conductive material positioned radially inward from said outer portion,
      an air-gap separating at least a part of said outer and said inner portions, and
      a stator positioned radially inward from said inner portion.

28. The flywheel-motor apparatus of claim 27, wherein said inner portion further comprises at least one current path and an electrically conductive annular portion electrically connected with said at least one current path.

29. The flywheel-motor apparatus of claim 27, wherein said flywheel-rotor assembly further comprises a disk having an outer surface, said disk unitarily joined to said inner portion and having radially extending modulated fins formed on said outer surface.

30. The flywheel-motor apparatus of claim 27, wherein said outer and said inner portions are cast from an aluminum alloy.

* * * * *